Nov. 24, 1936.  J. C. WATSON ET AL  2,062,077
HOSE SUPPORTER
Filed March 30, 1936
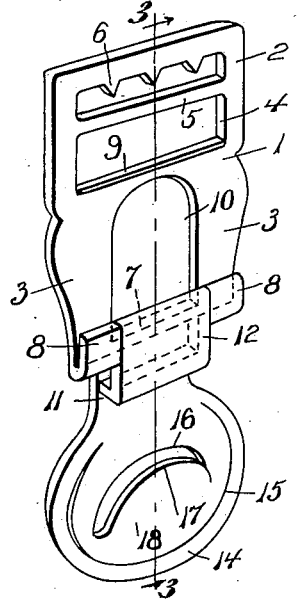
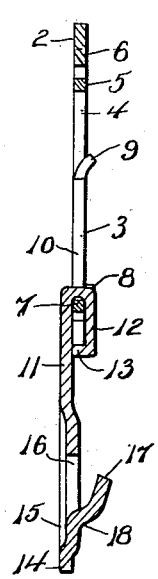
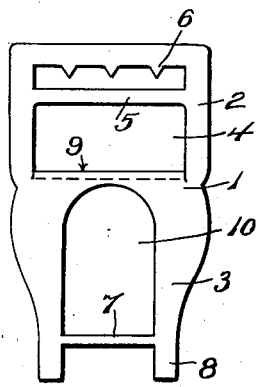
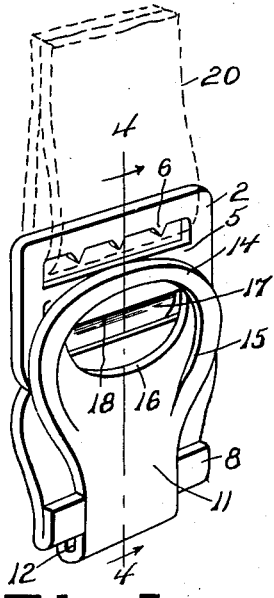
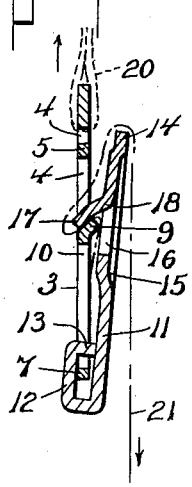
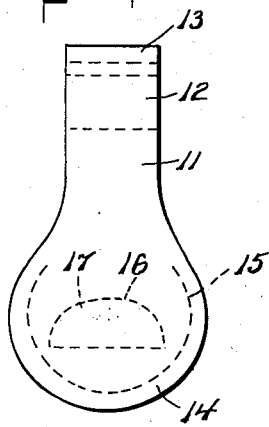
Inventor
James Curtis Watson
John Morrison Alexander
By Albert E. Dieterich
Attorney Patented Nov. 24, 1936

2,062,077

UNITED STATES PATENT OFFICE 2,062,077

HOSE SUPPORTER

James Curtis Watson and John Morrison Alexander, Vancouver, British Columbia, Canada Application March 30, 1936, Serial No. 71,752

5 Claims. (Cl. 24—248)

The present invention relates to certain new and useful improvements in hose supporters and it especially has for an object to perfect and render more economical to manufacture hose supporters of the kind disclosed in the application filed by Herbert T. Cottrell, July 9, 1935, Serial No. 30,546.

The Cottrell supporter consists generally of a frame or base member having a slot adjacent one end and having its other end bifurcated, the ends of the furcations being bent back to form pin-bearing or retaining elements to support a pin which crosses the space between the furcations and constitutes a pivot for a hose-engaging member having a hook to hook over a lip of the slot to clasp a hose between the base member and the hose-engaging member. Except for the pin-bearing elements, the parts of the base member lie wholly in one plane. A spring cooperates with the cross pin and the hose-engaging member to hold the members in the clasping position.

Several objections to the Cottrell supporter have developed in practice, which it is the object of the present invention to overcome— namely, the fact that the pivot or hinge pin is a separate element and must be mounted in the curled-over ends of the furcations is objectionable from the manufacturing standpoint of expense, and is also objectionable from the fact that the pin is likely to work out of the pin-holding elements; and, further, that there is too much side play between the base member and the hose-engaging member. Furthermore, it has been found that with the Cottrell supporter the lip, lying in the plane of the base member, makes it somewhat difficult to bring the hook portion over the lip to clasp the hose; and, lastly, the elastic strap has a tendency to draw to one side of the slot and cant the clasp out of alignment.

The present invention overcomes the above objections by inclining the lip outwardly from the plane of the base member, by forming the pivot pin integrally with the base member, by providing the cross bar, around which the elastic strap passes, with teeth or sharp points to engage the strap, and by locating the pivot pin inwardly from the ends of the furcations and bending the said ends back upon themselves to provide relatively long side abutments between which the loop or hinge end of the hose-engaging member lies.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:—

Figure 1 is a perspective view, on an enlarged scale, of the clasp per se, opened.

Figure 2 is a perspective view of the same, closed.

Figure 3 is a section on the line 3—3 of Figure 1.

Figure 4 is a section on the line 4—4 of Figure 2.

Figure 5 is an elevation of the base member.

Figure 6 is a similar view of the hose-engaging member before the reinforcing bead and tongue are stamped and the pivot loop bent into place.

In the drawing in which like numbers of reference indicate like parts in all the figures, I represents the base member having a slot 4 in its upper end, across which is a bar 5 dividing the slot into two portions, a lower part from which the lip 9 is bent outwardly (see Figures 3 and 4) at an angle, and an upper part into which the teeth 6 project. The lower part of the base is slotted at 10 to provide furcations 3. A hinge or pivot bar 7 extends across the slot from one furcation 3 to the other, and it is spaced inwardly from the ends of the furcations 3 to leave ends 8 which are bent back upon themselves to form side guides for the hose-engaging member and prevent it from having undue side movement. The top cross bar, around which the elastic strap 20 passes, is formed with the teeth or points integral therewith (and which project into the upper part of the slot 4, as aforementioned) to bite into the strap 20 and prevent side slip.

The base member according to the present invention is completed in two operations:—A single stamping operation shapes the member, including its lip 9, and a single bending operation bends back the ends 8; likewise, but two operations are required to form the hose-engaging member—a stamping operation and a bending operation.

The hose supporting member consists of a flat shank 11, one end of which is bent back upon itself and spaced as at 12, the edge being bent inwardly at 13, thereby providing an elongated slot to receive the pin 7. The other end of the shank 11 merges with a disc-like head having an offset 15 to leave a rim 14, thus stiffening the head. The offset portion of the head has a hook or tongue 17 stamped from it at 16 and bent at 18 to one side of the plane of the head, whereby the tongue 17 will hook over the lip 9, to hold the hose 21 in place (see dot and dash lines, Figure 4).

By virtue of the offset and inclined lip 9 and tongue or hook 17 the pull on the strap 20 and hose 21 (see arrows in Figure 4) tend the more tightly to clasp the hose and the rounded head bead 14 prevents cutting, tearing, or otherwise injuring the hose.

While the present clasp will operate satisfactorily on thin hose without a spring in the loop 11—12—13, a spring may be used, as in Cottrell's clasp, if and when desired.

From the foregoing description, taken in connection with the accompanying drawing, it is thought that the construction, operation and advantages of the present invention will be clear to those skilled in the art.

What we claim is:

1. In a hose supporter, two cooperating members one of which has a slot and a bifurcated portion, the other of which has an elongated loop and a flat head with a tongue or hook portion, a hinge pin integrally formed with the furcations of said bifurcated portion, said loop being located in said bifurcated portion with the hinge pin passing through the loop, the first of said members having an outwardly inclined lip over which said tongue or hook portion lies when in operation.

2. In a hose supporter, two cooperating members one of which has a slot and a bifurcated portion, the other of which has an elongated loop and a flat head with a tongue or hook portion, a hinge pin integrally formed with the furcations of said bifurcated portion, said loop being located in said bifurcated portion with the hinge pin passing through the loop, the first of said members having an outwardly inclined lip over which said tongue or hook portion lies when in operation, the slotted portion of said first mentioned member having teeth for the purposes described.

3. In a hose supporter, two cooperating members one of which has a slot and a bifurcated portion, the other of which has an elongated loop and a flat head with a tongue or hook portion, a hinge pin integrally formed with the furcations of said bifurcated portion, said loop being located in said bifurcated portion with the hinge pin passing through the loop, the first of said members having an outwardly inclined lip over which said tongue or hook portion lies when in operation, said head having an offset area surrounded by a bead-like portion for stiffening purposes.

4. In a hose supporter, two cooperating members one of which has a slot and a bifurcated portion, the other of which has an elongated loop and a flat head with a tongue or hook portion, a hinge pin integrally formed with the furcations of said bifurcated portion, said loop being located in said bifurcated portion with the hinge pin passing through the loop, the first of said members having an outwardly inclined lip over which said tongue or hook portion lies when in operation, the slotted portion of said first mentioned member having teeth for the purposes described, said head having an offset area surrounded by a bead-like portion for stiffening purposes.

5. In a hose supporter, two cooperating members one of which has a slot and a bifurcated portion, the other of which has an elongated loop and a flat head with a tongue or hook portion, a hinge pin integrally formed with the furcations of said bifurcated portion, said loop being located in said bifurcated portion with the hinge pin passing through the loop, the first of said members having an outwardly inclined lip over which said tongue or hook portion lies when in operation, said hinge pin being spaced from the ends of the furcations and said ends being bent back upon themselves to form side guides for said loop.

JAMES CURTIS WATSON.
JOHN MORRISON ALEXANDER.